United States Patent [19]

Hansen

[11] Patent Number: 4,827,501

[45] Date of Patent: May 2, 1989

[54] TELEPHONE CALL SCREENING APPARATUS

[75] Inventor: Gregory J. Hansen, Westminster, Colo.

[73] Assignee: American Telephone and Telegraph Company, AT&T Information Systems, Holmdel, N.J.

[21] Appl. No.: 909,047

[22] Filed: Sep. 18, 1986

[51] Int. Cl.⁴ ............................................. H04M 1/00
[52] U.S. Cl. ..................................... 379/199; 379/188
[58] Field of Search ....................... 379/199, 200, 188

[56] References Cited

U.S. PATENT DOCUMENTS

| | | | |
|---|---|---|---|
| 4,266,098 | 5/1981 | Novak | 379/77 |
| 4,429,188 | 1/1984 | Allen | 379/188 |
| 4,446,334 | 5/1984 | Groff | 379/188 |
| 4,674,115 | 6/1987 | Kaleita et al. | 379/199 Z |

Primary Examiner—James L. Dwyer
Attorney, Agent, or Firm—Ruloff F. Kip

[57] ABSTRACT

A device for screening unwanted telephone calls is connectable at a station between a telephone set and a wall outlet plug. In response to ringing current received at the station and signaling an incoming call, the device delays audible ringing at the station for a 2.5 second period. During such period, the call's sender transmits to the station a # dial signal only if the call is in a special category as, say one undertaken to try to make a sale. If such # signal is received during such period, the device transmits back to the sender a return signal acknowledging that the call has been received and rejected at the station, and the device then hangs up call at the station without any audible ringing taking place there. If no such # signal is so received, audible ringing occurs at the line upon expiration of such period, and the call continues in its normal sequence.

6 Claims, 4 Drawing Sheets

TELEPHONE CALL SCREENING APPARATUS

FIELD OF THE INVENTION

This invention relates, generally, to methods and means for screening incoming telephone calls to determine whether or not they are in an unwanted category. More particularly, this invention relates to methods and means of such kind for rejecting calls in such a category in a manner whereby the called party never knows that the call has been made.

BACKGROUND OF THE INVENTION

A common problem among residential telephone subscribers is the growing number of bothersome solicitation calls received at the station set. Many such calls are unwanted and are a waste of time to the subscriber. The problem bears a resemblance to so called "junk mail" in that such calls are frequently unwanted. However, with junk mail the victim may have his name purged from mailing lists. In the case of junk phone calls no such recourse exists.

SUMMARY OF THE INVENTION

Such problem is overcome according to the invention in one of its aspects by providing apparatus which is designed for use at a telephone set station to screen telephone calls incoming thereto over telephone lines from a central office, and which apparatus comprises: source means of electric tone signals, transducer means to convert such signals to audible ringing tones, gate means coupled between said source and transducer means to transfer said signals from the former to the latter, delay means adapted on being triggered to disable such gate means for a period from transferring such signals, call answering means responsive to ringing current on said lines signaling a call to said station to trigger said delay means to start said period and to make a connection providing a path for transmission of said call to said station, Touch Tone (TT) signal detector means responsive to a special TT signal transmitted over said path and applied during said period by the sender of said call and designating it as being in a specified category to produce an indication of receipt at said station of said TT signal, and call terminating means responsive to said indication to break said connection so as to signal said office that said call is rejected and to automatically terminate said call at said station without there being audible ringing thereat.

According to the invention in another of its aspects, such apparatus comprises call answering means to signal the central office of completion of a call, the mentioned TT signal detector means, the mentioned call terminating means for automatically terminating the call if the call is designated by receipt of a TT signal as being in a specified category, and responder means operable upon such receipt to transmit to the sender of the call a return signal adapted to inform the sender that the call has been received and rejected.

BRIEF DESCRIPTION OF THE DRAWINGS

For a better understanding of the invention, reference is made to the following description of a representative embodiment thereof, and to the accompanying drawings wherein.

DESCRIPTION OF DETAILS OF EMBODIMENT

Figure 1:
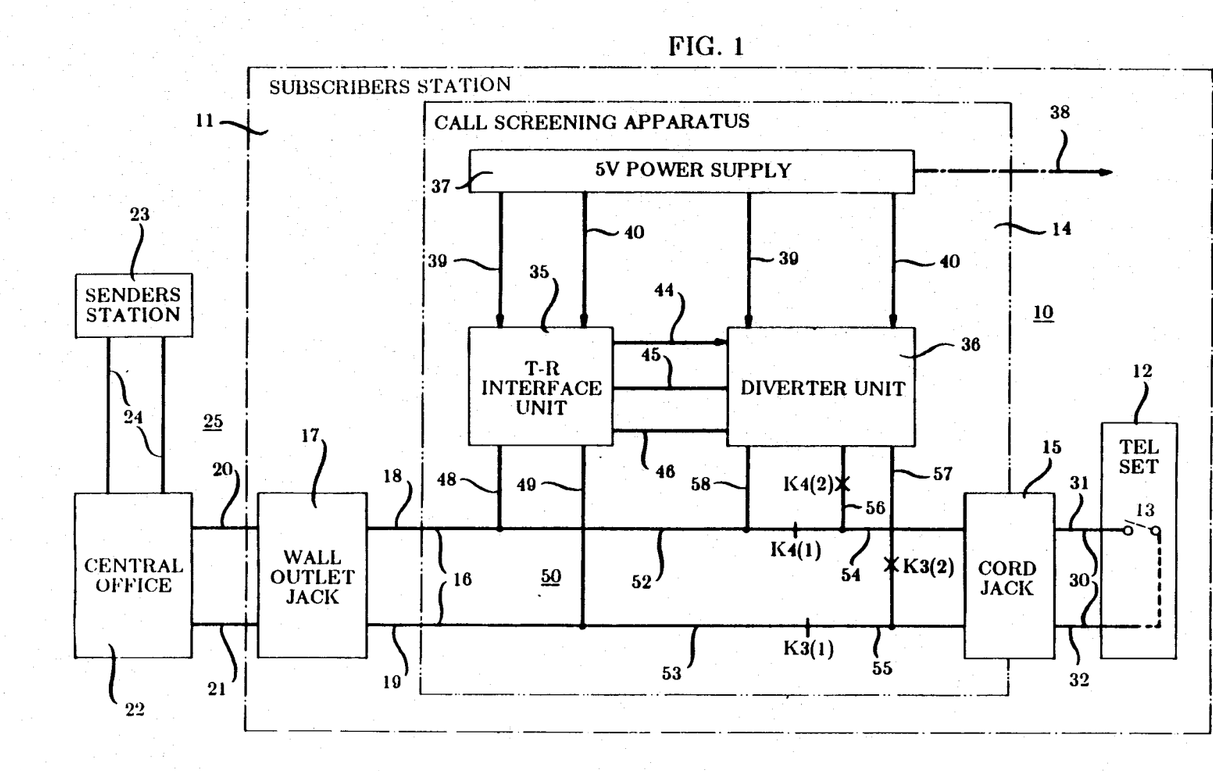
FIG. 1 is a block diagram of a telephone network to which is connected an exemplary embodiment of telephone call screening apparatus according to the invention.

Referring now to FIG. 1, the reference number 10 generally designates a telephone call screening apparatus located at a residential subscriber's station 11 at which is also located a conventional telephone set 12 including among its components a line switch (i.e., hook switch) 13 shown in dash-dash line. Apparatus 10 is a modular device having a common housing 14 for its operating units. Device 10 includes a jack 15 in the right side (FIG. 1) of housing 14 and a cord 16 extending outward from the left side of housing 14 and terminating at its free end in a plug (not shown) received in a wall outlet jack 17 at station 11. Cord 16 comprises insulated tip and ring conductors 18 and 19 connected through jack 17 to corresponding outside telephone lines 20, 21 leading to a central office 22 having switching facilities. Office 22 serves a large number of subscriber's stations including station 11 and another station 23 described herein as the sender's station and connected to office 22 by outside telephone lines 24. The mentioned telephone lines, stations and office all form part of a large telephone network generally designated by the reference numeral 25. Stations 11 and 23 may of course be any two stations capable of being linked together by network 25 through one or more central offices.

The cord jack 15 of device 10 provides a receptacle for the plug (not shown) at the free end of a line cord 30 constituting part of telephone set 12 and comprising insulated tip and ring conductors 31 and 32. In the FIG. 1 arrangement, set 12 is connected to the network 25 through device 10. Alternatively, however, the cord 30 of set 12 can be unplugged from jack 15 and plugged directly into wall outlet jack 17 in lieu of cord 16 of device 10. By so doing, device 10 is put out of use and becomes superfluous. Thus, call screening apparatus 10 constitutes a modular unit which can be inserted or not as desired into the coupling of any residential telephone set to a wall jack to provide for that set the call screening and rejecting functions performed by that unit.

The device 10 internally comprises a T-R interface unit 35, a call diverter unit 36 and a power supply unit 37 having a cord 38 pluggable into a wall outlet (not shown) of a power line of a public utility and adapted to convert the a.c. power available from such line into +5 and −5 volt d.c. power supplied via leads 39, 40 to units 35, 36 to provide operating power for those units. Interface unit 35 communicates with diverter unit 36 through leads 44, 45, 46 and with outside telephone network 25 through tip and ring leads 48, 49 connected at a "Y" junction 50 to the corresponding leads 18 and 19 of output cord 16 of device 10. Also, directly connected to those leads 18 and 19 at "Y" junction 50 are a pair of leads 52, 53 connected through break contacts K4(1) and K3(1) of relays K4 and K3 (later described in more detail) to leads 54 and 55 connected through cord jack 15 to the conductors 31 and 32 in the cord 30 of telephone set 12. The diverter unit 36 is in circuit through leads 56 and 57 and make contacts K4(2), K3(2) in those leads to the mentioned leads 54 and 55 to be electrically connected with the latter leads when such make contacts are closed. Unit 36 is also connected via lead 58 to lead 52. In the normal quiescent operating condition of device 10, the make contacts K4(2) and K3(2) of relays K4 and K3 are, in fact, closed, and the break contacts K4(1) and K3(1) of those relays are open. Accordingly, for such normal quiescent operating condition, the telephone set 12 is, because of the openness of contacts K4(1) and K3(1), not connected to the output cord leads 18, 19 through the straight line path provided by leads 52, 53, 54, 55. Rather, set 12 is connected to those cord output leads only through the path including leads 48, 49, interface unit 35, leads 45, 46, diverter unit 36, leads 56, 57 and make contacts K4(2), K3(2) in the latter leads.

Figure 2:
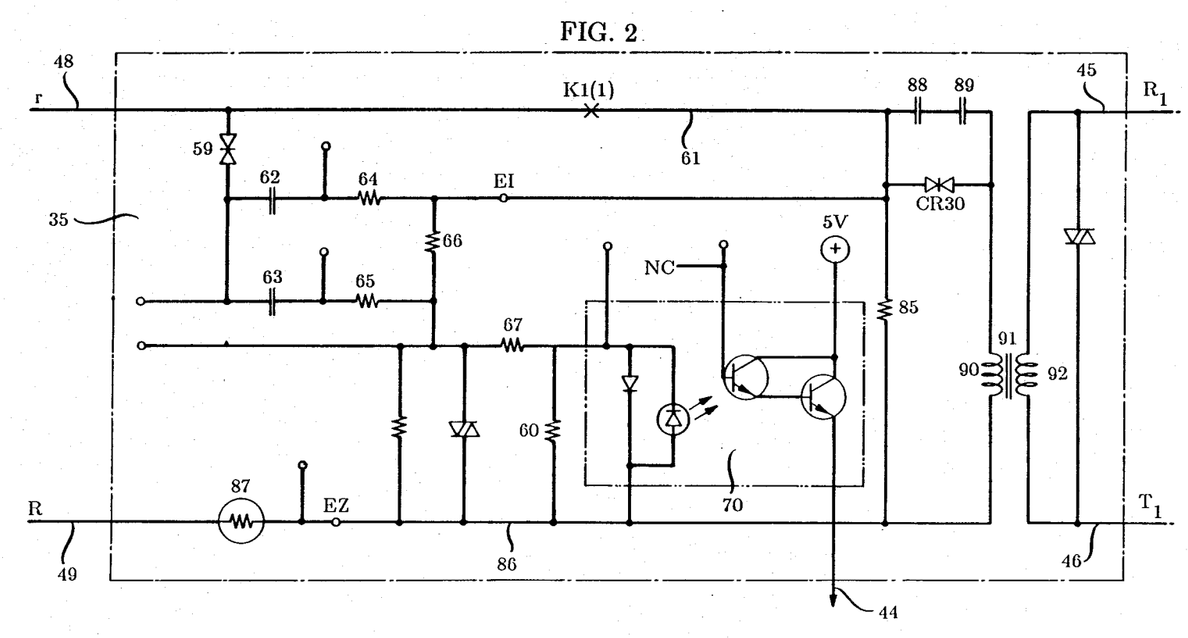
FIG. 2 is a schematic diagram of the T-R Interface Unit of the FIG. 1 call screening apparatus.
Figure 3:
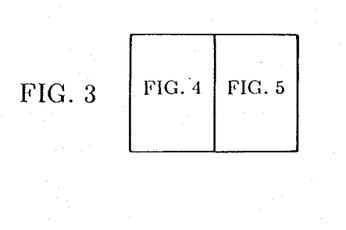
FIG. 3 is a diagram showing the interrelationship of the schematic diagrams of the following FIGS. 4 and 5.

Referring now to FIG. 2 which shows the circuitry of T-R interface unit 35, such circuitry is, with two exceptions, identical with that of the well known T-R interface unit used in conjunction with the Merlin ™ key telephone system (sold by AT&T Information Systems Inc., a subsidiary of American Telephone and Telegraph Corporation) to act as a buffer between the telephone sets of that system and the outside telephone lines serving it, and to aid in providing "pseudo ringing" so that the individual ringers of such sets need not be relied on to produce audible ringing in response to ringing current applied to the system from the central office. The mentioned exceptions are (1) that the shown resistor 60 has been added to the circuitry to decrease its sensitivity to ringing current from central office 22, and (2) the make contacts K1(1) of a relay K1 have been added in circuit between the input "tip" lead 48 for unit 35 and a conductor 61 within that unit. Since the circuitry of unit 35 is otherwise already well known, it will not hereafter be described in much detail.

For a better comprehension of the circuitry and operation of the interface unit 35, assume that a person at station 23 (the "sender") desires to make a telephone call to another person (the "subscriber" or "receiver") at station 11. Before such call, d.c. voltage is applied from central office 22 across input leads 48, 49 of unit 35 so that ring lead 49 is at −48 volts. Unit 35, however, then provides no low impedance internal connection for flow of d.c. current between those leads.

The sender initiates such call by dialing all the digits of the telephone number assigned to station 11 and, on completion of the dialing of the last of such digits and being signaled that subscriber station 11 is then "on hook", central office 22 sends back over lines 24 to station 23 a burst of a.c. current heard by the sender as audible ringback and, also, forwards over lines 20, 21 to station 11 a first burst of ringing current at 90 volts a.c. and 20 Hz. That a.c. ringing current is applied from leads 48, 49 to a voltage dividing network connected between such lead 48 and a lead 86 connected to lead 49 through thermistor 87 to be essentially an extension of lead 49. The network comprises a voltage limiter 59, capacitors 62, 63, and resistors 64–67 and 60. From that network, the ringing current is applied to the input of an electro-optical isolator circuit 70 which prevents the d.c. power from power supply 37 from becoming mingled with the voltages and currents of telephone network 25. Within isolator 70 the positive and negative alternations of the burst of ringing current applied to the input side of the isolator are converted on the output side thereof into a train of logic high pulses supplied via lead 44 to the diverter unit 36.

Within the diverter unit (FIGS. 4 and 5) the train of logic pulses is integrated by the circuit of capacitor 71 and resistor 72 (FIG. 4) to produce on a first input of NAND circuit 75 (FIG. 5) a pulse of progressively increasing amplitude. If, as normally it is at the onset of a call to station 11, the handset (not shown) of telephone set 12 is in its cradle so that line switch 13 is open and set 12 is "on hook", a monostable multivibrator 76 is residing in its normal stable state to supply a high signal level over lead 74 on a second input to NAND circuit 75. That circuit responds to concurrence of such high signal level on such second input and the presence on the first input to circuit 75 of a pulse at or above a "high" threshold level to produce at the output of the circuit a pulse which may be unpredictably variable in duration, but which triggers a timer 77 to produce therefrom a high output pulse of fixed and definite duration. The latter pulse is passed through an exclusive NOR circuit 79 to drive a bistable multivibrator or "flip-flop" 80 from its passive state to an active state in which the flip-flop output is low on an output lead 81. The lowness of such output causes flow of current through winding K1(2) of relay K1 to "pull up" the relay to produce closure of the relay make contacts K1(1) shown in FIG. 2.

The closure of relay contacts K1(1) has the following effects in the T-R interface unit 35.

First, such closure makes a low impedance connection together, at station 11, of tip and ring leads 48 and 49 through a circuit path comprising those contacts K1(1), the lead 61 to the right of those contacts and a resistor 85 connected at its opposite ends to lead 61 and lead 86 which, as stated, is basically merely an extension of input ring lead 49. The making of that low impedance connection transmits back to the central office 22 a signal substantially the same as that which would be produced if the cord 30 of telephone set 12 were to be directly plugged into wall jack 17 and the line switch 13 of the set were then to be closed. Thus, such transmitted-back signal provides an indication to office 22 of completion at station 11 of the call sought to be made thereto, and the central office responsively permits the voice frequency components of the call to be transmitted over lines 20, 21 to station 11.

A second effect of the closure of the relay contacts K1(1) is that it completes between lead 48 and lead extension 86 of lead 49 a circuit path designed to carry the voice frequency components of the call and comprising in series such contacts K1(1) themselves, capacitors 88, 89 and the primary winding 90 of an audio frequency transformer 91. These voice frequency components appear in the secondary winding 92 of such transformer and are supplied from such secondary winding to the diverter unit 36 via the leads 45, 46 connected to opposite ends of that winding.

Diverter unit 36 includes (FIG. 4) source means of electric tone signals in the form of a touch-tone decoder circuit 95 which includes a continuously running crystal controlled oscillator. The oscillating output of decoder circuit 95 is supplied via lead 96 to a first frequency divider 97 in the form of a 12 bit binary counter. The output of divider 97 is an electric tone signal of a frequency of about 874 Hz. That signal is supplied via audio lead 98 to a second frequency divider 99 in the form of a 12 bit binary counter having output leads 100, 101, 102 connected to various of its stages. A control signal supplied via lead 108 from an output of flip-flop 80 to a connection 109 between the frequency dividers 97 and 99 prevents element 99 from operating to generate a tone signal unless flip-flop 80 is in its active state.

Figure 4:
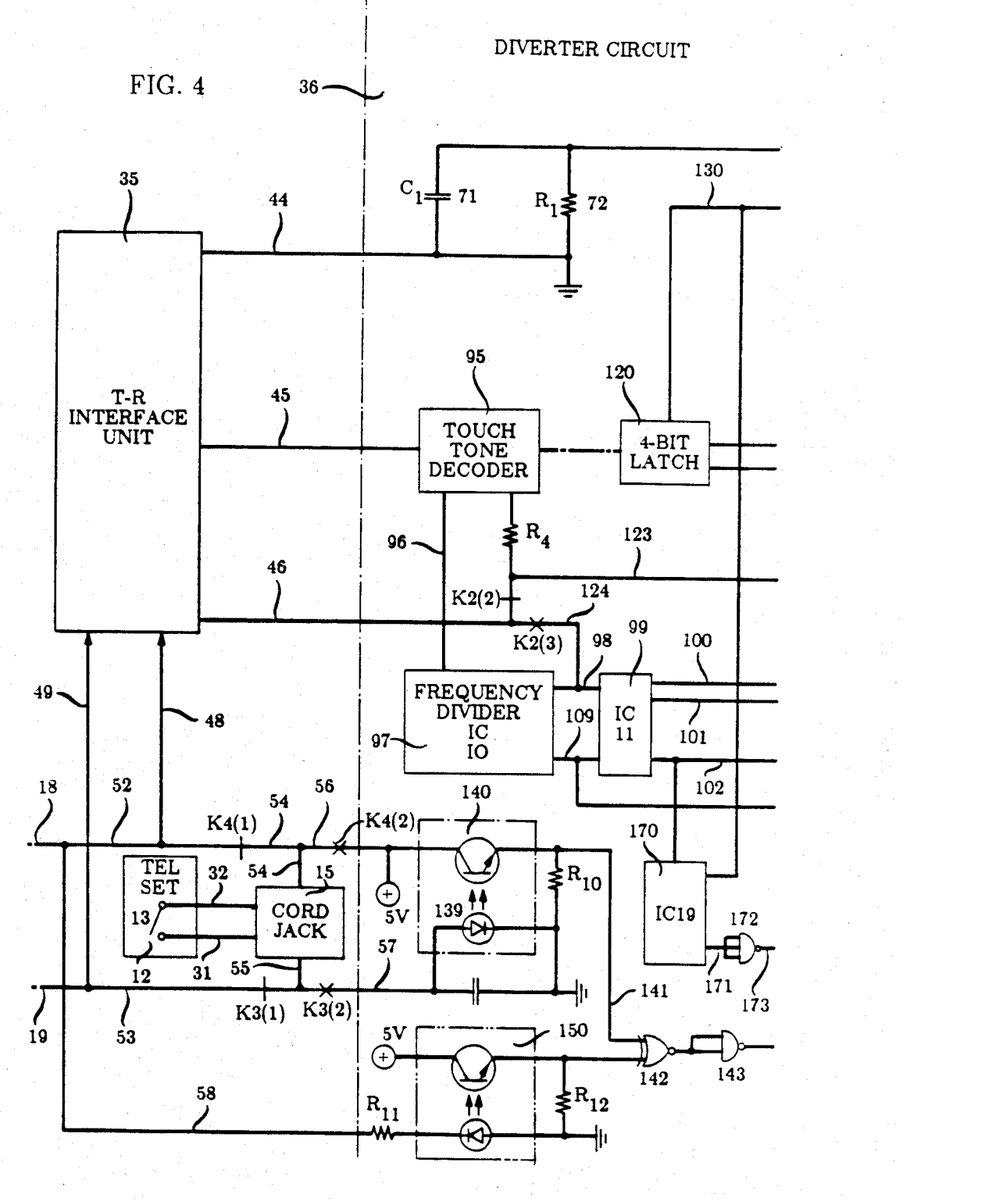
FIG. 4 is a schematic diagram of the left hand side of the diverter unit of the FIG. 1 apparatus.

Leads 100, 101 provide inputs to a NAND circuit 103 of which the output 104 is a first input to a NAND circuit 106, and lead 102 is connected as a second input to NAND circuit 106 having lead 107 as its output. The combination of NAND circuits 103, 106 and their input and output leads constitutes a gate circuit interposed between frequency divider 99 and an electroacoustic transducer or speaker 110. When enabled to do so, such gate circuit is adapted to transfer the 874 Hz tone signal from frequency divider 99 in intermittent bursts to speaker 110 to cause it to generate sound waves heard as bursts of audible ringing. That ringing is known as "pseudo-ringing" because it is produced as a substitute for, and in lieu of, the "true" ringing which would be produced by the ringer (not shown) in telephone set 12 if that set were to be connected in circuit with central office 22 when the latter is sending ringing current to station 11.

Figure 5:
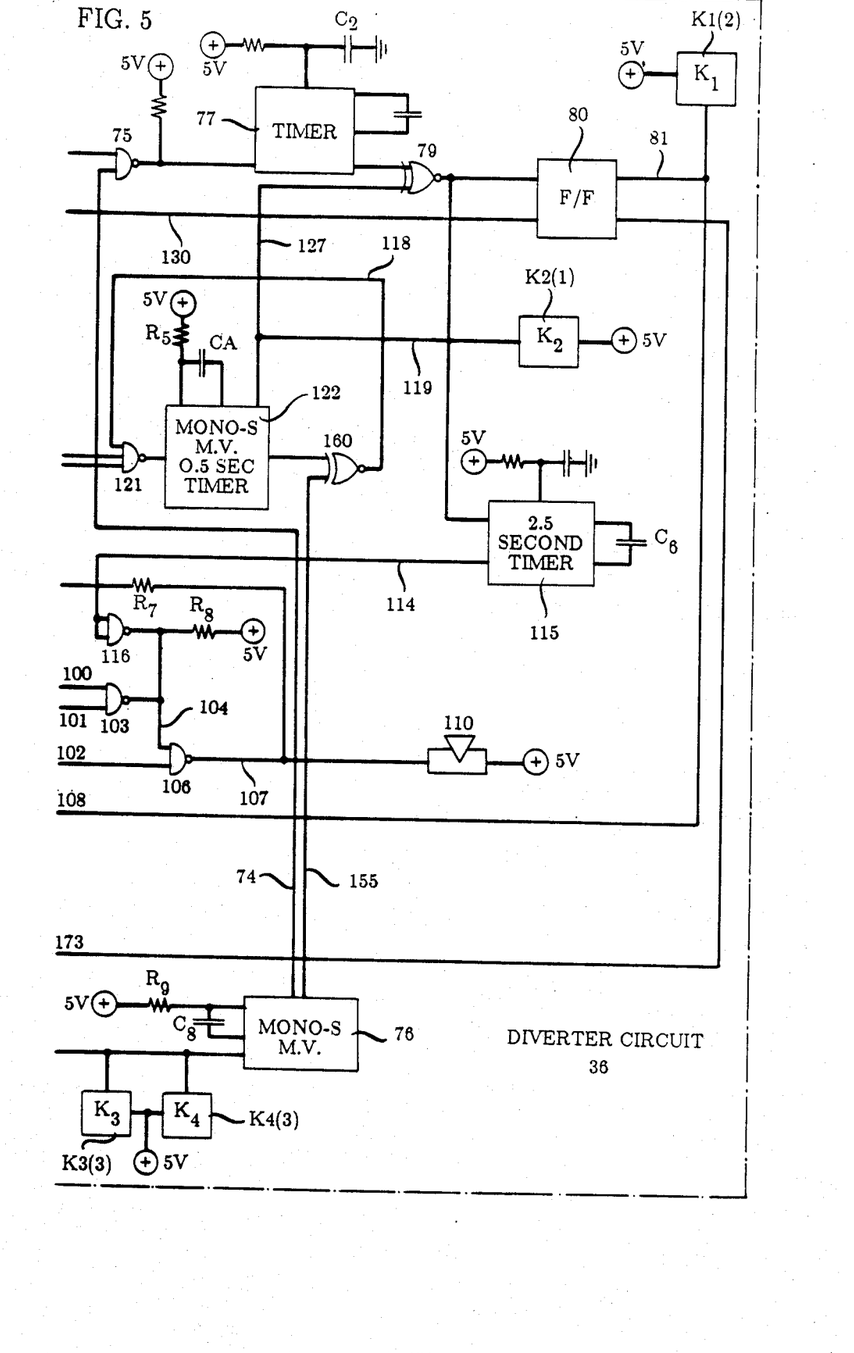
FIG. 5 is a schematic diagram of the right hand side of the diverter unit of the FIG. 1 apparatus.

The same trigger output pulse from NOR circuit 79 which drives flip-flop 80 to active state serves to trigger a delay means in the form of a timer 115 to produce on a lead 114 a high square wave converted by an inverting NAND circuit 116 to a low square wave and then applied to the lead 104 of the mentioned gate circuit. The application of such wave to such circuit disables such circuit from transferring the tone signal from frequency divider 99 to speaker 110 for a delay period which may vary in length but has a maximum length of 2.5 seconds. Hence, for that period, no audible pseudo-ringing will be produced at station 11 by speaker 110.

The delay of pseudo-ringing at station 11 for a period after the call's sender at station 23 hears the removal of ringback from office 22 (signaling completion of the call at station 11) is an expedient permitting determination at station 11 as to whether or not the call is in an "unwanted" or other specified category. Such determination is made as follows.

Assume that the purpose of the sender in making the considered telephone call is to attempt to persuade the intended receiver of it to purchase something or, in other words, belongs to the category of what will be referred to herein as "sales calls". Many telephone subscribers regard calls in such category as being burdensome and would prefer not to have to respond to them. This being so, it is not unlikely that senders of such calls may, in the future, either be required by law to provide a designation that the call is in such category or, alternatively, would be willing to voluntarily do so. In accordance with the invention hereof, it is contemplated that such designation would be made by the call's sender using his set at station 23 to output during such period a special TT signal which identifies the telephone call in progress as being in the specified category of, say, a "sales call", and which TT signal is transmitted from sender's station 23 over network 25 to station 11. Conveniently (but not necessarily), such TT signal may be the touch tone dial signal produced by depression of the key of the touch-tone keyboard which bears the "pound sign", i.e., the "#" sign.

If the sender transmits the # signal in that period, such signal will be supplied via the voice components path in interface unit 35 and over leads 45, 46 to diverter unit 36 and, within the latter unit, to touch-tone decoder 95. If and only if decoder 95 detects the presence at its input of the # signal, decoder 95 drives a 4-bit latch 120 from its normal "off" state to an "on" state. The change of state of latch 120 is manifested as a change from low to high at two of the inputs of a NAND circuit 121 which is then receiving a high on its third input from a lead 118. The latch change of states causes the output of circuit 121 to go low to trigger a monostable multivibrator timer 122 to assume its unstable state for a period of 0.5 second and, while it is in such unstable state, to energize via lead 119 the winding K2(1) of relay K2 to thereby cause the opening and closing of, respectively, break contacts K2(2) and make contacts K2(3), such contacts being disposed (FIG. 4) close to the input lead 46 for diverter unit 36. The effect of the opening of break contacts K2(2) is to interrupt for such 0.5 second the transmission, over lead 46, contacts K2(2), lead 123, resistor R4, and TT decoder 95 at station 11 of additional Touch Tone signals which may be transmitted by station 23. The effect of the closing of the make contacts K2(3) is to establish transmission for 0.5 seconds of the 874 Hz tone signal from the audio output lead 98 of frequency divider 97, through lead 124 and contacts K2(3) and lead 46 and, from thence, ultimately back to the sending station 23. That 874 Hz tone signal will be heard by the sender at station 23 as an audible sound tone constituting an indication to such sender that the "sales call" placed to the dialed station 11 has been received at that station but has been rejected.

At the end of the 0.5 second period, monostable multivibrator 122 changes back to its stable state with the following results. First, such change de-energizes relay winding K2(1) to open and close, respectively, relay contacts K2(3) and K2(2) to thereby terminate the transmission of the 874 Hz return signal through contacts K2(3) to the sender at station 23. Second, such change is transmitted from the output of timer 122 through lead 127 and NOR circuit 79 to flip-flop 80 so to cause that flip-flop to revert to its passive state. When such happens, relay winding K1(2) is de-energized to open make relay contacts K1(1) in the T-R interface unit 35 to thereby hang up the call at station 11 by (a) breaking the low impedance connection provided through those contacts and resistor 85 between leads 48 and 86, and by (b) opening up the path through capacitors 88, 89 and transformer primary 90 for voice frequency components of telephone calls. Other effects of the change of flip-flop 80 from active to passive state are that a signal is sent from the flip-flop output via lead 130 to latch 120 to reset the latch, and the change in level due to such change in state is transmitted over leads 108 and 109 to frequency divider 97 to disable it from producing electrical tone signals.

As will be evident from the foregoing, if the call incoming to station 11 has been designated by the sender by the use of the # touch-tone dial signal as being a "sales call", the call is automatically terminated at that station without any audible ringing there occurring. The subscriber at such station is thus not bothered by such ringing and, in fact, does not even know the call was made. The sender of the call, however, is informed by the transmission of the 874 Hz return signal that the call has been completed at station 11 and has there been rejected. Note that, so long as the sender transmits the category designating # signal within 2.5 seconds after completion of the call at station 11, the call is terminated in immediate response to the transmission of the # signal. Hence, the mentioned delay period occurring at station 11 is variable in length up to 2.5 seconds but cannot exceed 2.5 seconds.

Assume now that the call incoming to station 11 is not in an unwanted category so that, during the mentioned delay period, the call's sender does not transmit any # signal or other signal designating the call as being in such a category. In that instance, the delay signal from timer 115 ceases 2.5 seconds after completion of the call at station 11 so as, by such ceasing, to no longer disable gate circuit 103, 106 from transmitting bursts of the tone signal from frequency divider 99 to speaker 110. Accordingly, such bursts flow to that speaker to produce audible pseudo-ringing and pseudo-ringback to station 23 through R7. This normally continues until the handset (not shown) of telephone set 12 is lifted from its cradle to thereby close line switch 13.

The closure of that switch completes a circuit path from +5 volt d.c. supply through then closed relay contacts K4(2), line switch 13, then closed relay contacts K3(2) and a light emitting diode 139 in the input of electro-optical isolator circuit 140 to produce current flow through that diode. As a result, there is produced in the output of circuit 140 a signal transmitted via lead 141 to an exclusive NOR circuit 142 and from that circuit to an inverting NAND circuit 143 which responds to such signal to de-energize the windings K3(3) and K4(3) of relays K3 and K4. Effects of the de-energization of those windings are to close break contacts K3(1) and K4(1) so as to couple telephone set 12 directly across tip and ring leads 52 and 53 and, concurrently, to open make contacts K3(2) and K4(2) so as to open up leads 56 and 57 and thus decouple telephone set 12 from the diverter unit 36.

A result of the opening of make contacts K3(2) and K4(2) is, of course, to open up the described circuit for current flow through the input of isolator 140 so as, absent a counter effect, to produce re-energization of the windings K3(3) and K4(3). Such re-energization is prevented however by a relay "self-holding" circuit comprising an electro-optical isolator 150 having its input connected (FIG. 4) on the right-hand side to ground and, on the left-hand side, through a path including elements 58, K4(1), 54, 12, 15, 55 and K3(1) to the −48 volts d.c. supplied on ring lead 53 from central office 22. Isolator 150 has its output connected as another input to exclusive NOR circuit 142 so that, even after cessation of the signal from isolator 140 to NOR circuit 142, a signal from isolator 150 is supplied to such NOR circuit to continue to maintain relay winding K3(3) and K4(3) in de-energized state, i.e., to "hold down" such relay windings.

The action of NAND circuit 143 which de-energizes relay windings K3(3) and K4(3) also serves to trigger monostable multivibrator 76 to change to its unstable state to thereby produce at its output and on leads 74 and 155 a change of state during which the multivibrator output level on lead 74 changes from normal high value to low value. That low signal is transmitted by lead 74 to an input of NAND gate 75 to cause at its output a change in signal level from low to high, which triggers timer 77 to produce therefrom a high output pulse of fixed and definite duration. The latter pulse is passed through an exclusive NOR circuit 79 to flip-flop 80 to cause that flip-flop to revert to its passive state to thereby set into motion the sequence of events earlier described as following on the reversion of such flip-flop to its passive state. In this instance, however, such reversion to passive state of flip-flop 80 does not terminate the call inasmuch as telephone set 12 is, at the time, directly connected across the tip and ring leads for the telephone network. Instead, the return to passive state of flip-flop 80 and the effects consequent thereon merely resets the diverter unit 36 for the next telephone call.

In the event the incoming nondiverted call is unanswered, counter 170, driven by pseudo-ring bursts on lead 102, outputs on the eighth burst a high state on lead 171. This high applied to the inputs of inverter 172 produces a low at its output lead 173 clearing flip-flop 80 and consequently thereon resetting the diverter 36 for the next telephone call.

Assume that now that it is desired to place a call outgoing from the subscribers station 11. Such call is initiated in the conventional manner by lifting the handset (not shown) of telephone set 12 off its cradle to produce closure of line switch 13. Upon the closure of that switch, isolator circuits 140 and 150 operate as earlier described to initially de-energize relay windings K3(3) and K4(3) and to then hold them de-energized such that telephone set 12 is connected through closed break contacts K3(1) and K4(1) through ring and tip leads 53 and 52 and ring and tip conductors 19 and 18 of cord 16 (FIG. 1) to the wall outlet jack 17 and thence to the ring and tip conductors 21 and 20 of telephone network 25. Upon such connection of the telephone set to network 25, the making of the outgoing call from station 11 progresses in the conventional manner for such calls. During such a call, make contacts K3(1) and K4(1) are open to disconnect the diverter unit 36 from the various tip and ring leads and conductors by which set 12 is connected to network 25. Also during such a call, make relay contacts K1(1) in the T-R interface unit 35 are open so that the tip and ring leads 48 and 49 are connected together within that unit only through elements 86, 87 and the relatively high impedance voltage dividing circuits which, as earlier described, cause electroptical isolator 70 to produce high logic pulses in response to ringing current received from central office 22. Additionally, in the event such a call is initiated during an incoming-divert sequence, then as a result of K3 and K4 de-energizing, monostable multivibrator 76 generates a low-high transition on lead 155, quickly inhibiting NAND gate 121 to prevent operation of K2 and the application of divert-acknowledge tone to tip lead 46 as divert-acknowledge tone is not relevant to outgoing calls and would be unpleasant to the subscriber. Accordingly, it will be evident that the telephone screening apparatus 10 plays no functional role in the making of outgoing telephone calls from a subscriber's station such as station 11.

Finally, assume that, because electric utility power has failed at station 11 or, alternatively, the cord 38 (FIG. 1) for supplying device 10 with utility power has become disconnected, the telephone screening apparatus 10 has been rendered inoperable. The circuitry of such apparatus provides the advantage in that instance that inasmuch as relay windings K3(3) and K4(3) will be de-energized, telephone set 12 will, as described above, be connected through closed break contacts K3(1) and K4(1) to the outside telephone lines and can be used in its normal manner both to receive incoming calls and to make outgoing calls.

The above described embodiment being exemplary only, it will be understood that additions thereto, omissions therefrom and modifications thereof can be made without departing from the spirit of the invention, and that, accordingly, the invention is not to be considered as limited save as is consonant with the scope of the following claims.

What is claimed is:

1. Apparatus for use at a station for a telephone set to screen telephone calls incoming thereto over telephone lines from a central office, said apparatus comprising:

source means of electric tone signals, transducer means to convert such signals into audible ringing tones, gate means coupled between said source and transducer means to transfer said signals from the former to the latter, delay means adapted on being triggered to disable such gate means for a delay period from transferring such signals, call answering means responsive to ringing current on said lines signaling a call to said station to trigger said delay means to start said period and to make a connection providing a path for transmission through said lines to said station of voice frequency components of said call, dial signal detector means responsive to a dial signal transmitted over said path and dialed during said period by the sender of said call and designating said call as in a specified category to produce an indication of receipt at said station of said dial signal, and call terminating means responsive to said indication to promptly thereafter break said connection so as to (a) signal said office that said call is rejected, and (b) automatically terminate said call at said station without there being audible ringing thereat.

2. Apparatus according to claim 1 in which said designating dial signal is a touch-tone dial signal.

3. Apparatus according to claim 1 further comprising responder means operable upon detection at said station of said designating dial signal to transmit over said lines to said sender a return signal for informing said sender that said call has been received and rejected at said station.

4. Apparatus according to claim 3 in which said return signal is an audio frequency signal derived from the operation of said source means of electric tone signals.

5. Apparatus according to claim 4 further comprising, timer means for limiting to a fixed time interval within said delay period the outgoing transmission of said return signal over said lines, said timer means being operable at the end of said interval to actuate said call terminating means to forthwith terminate said call.

6. Apparatus according to claim 1 further comprising, relay means for normally maintaining said call answering means connected across said lines and normally maintaining disconnected from said lines a telephone set having a normally open line switch therein, said relay means being responsive to closure of said line switch to connect said set across said lines and to disconnect said call answering means therefrom.

* * * * *

UNITED STATES PATENT AND TRADEMARK OFFICE
CERTIFICATE OF CORRECTION

PATENT NO. : 4,827,501

DATED : 05/02/89

INVENTOR(S) : Gregory J. Hansen; Neil I. Skau

It is certified that error appears in the above—identified patent and that said Letters Patent is hereby corrected as shown below:

Inventor:

At [75], page 1, add --Neil I. Skau, III, Arvada, Colo.--.

Item [19], "Hansen" should read --Hansen et al--

Signed and Sealed this

Sixth Day of February, 1990

Attest:

JEFFREY M. SAMUELS

Attesting Officer     Acting Commissioner of Patents and Trademarks